Figure 1:
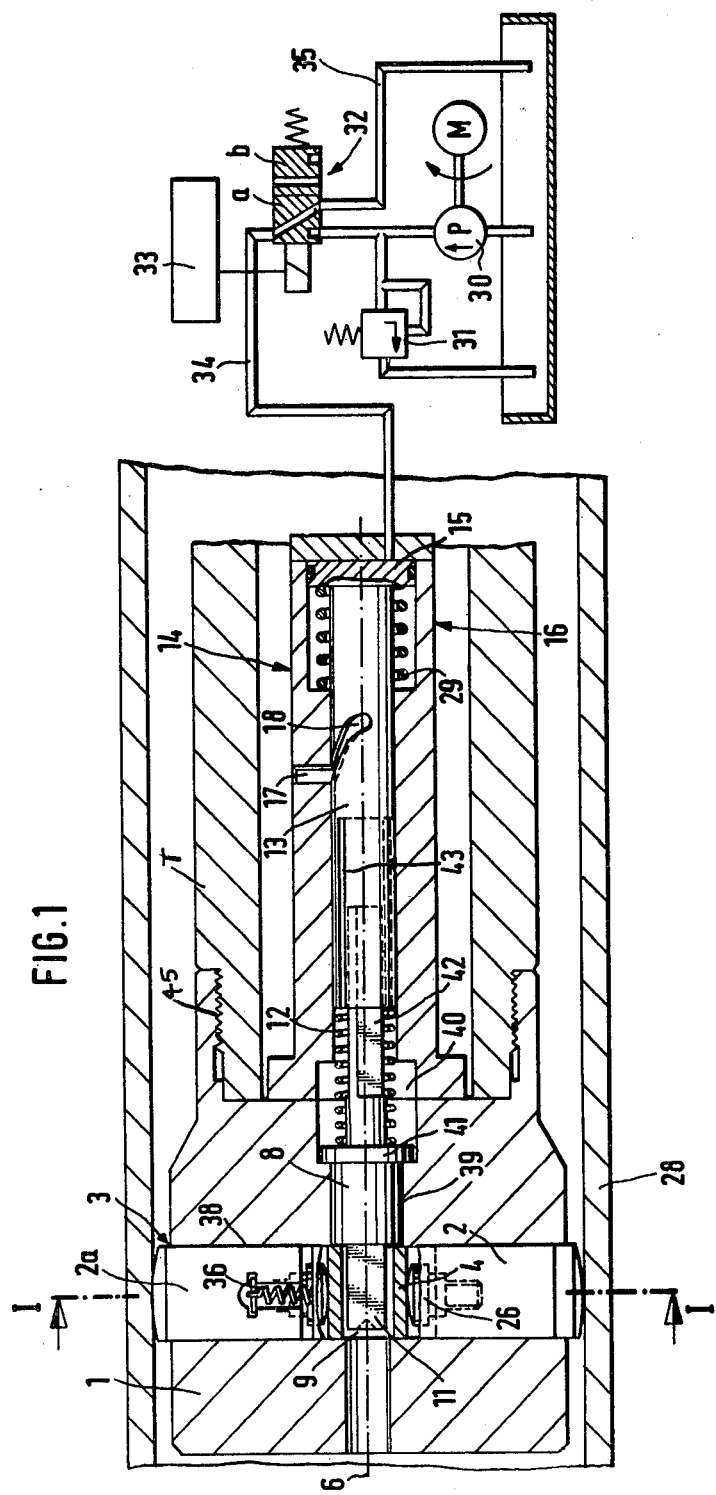

United States Patent [19]

Liermann

[11] 4,375,773

[45] Mar. 8, 1983

[54] OSCILLATING CUTTING TOOLHEAD

[75] Inventor: Manfred Liermann, Erkelenz, Fed. Rep. of Germany

[73] Assignee: Wilhelm Hegenscheidt Gesellschaft mbH, Erkelenz, Fed. Rep. of Germany

[21] Appl. No.: 185,602

[22] Filed: Sep. 9, 1980

Related U.S. Application Data

[63] Continuation-in-part of Ser. No. 126,905, Mar. 3, 1980, abandoned.

[30] Foreign Application Priority Data

Mar. 16, 1979 [DE] Fed. Rep. of Germany ....... 2910341

[51] Int. Cl.³ .......................................... B23B 29/034
[52] U.S. Cl. ........................................ 82/1.2; 408/178
[58] Field of Search .................. 82/1.2; 408/171, 173, 408/176, 178

[56] References Cited

U.S. PATENT DOCUMENTS 3,902,386  9/1975  Dressler et al. ................... 408/158
4,289,431  9/1981  Berstein ............................... 408/154

Primary Examiner—Leonidas Vlachos
Attorney, Agent, or Firm—Arthur B. Colvin

[57] ABSTRACT

The present disclosure relates to an oscillating cutting toolhead having an oscillating cutter comprising two blades which are prestressed radially inwardly, the blades bearing against opposite points of a spacer disposed therebetween, the device being characterized in that the spacer has a cross section of generally circular form with two opposed parallel, axially extending flattened portions, the spacer being axially non-displaceable yet rotatable about the longitudinal axis of the tool and arranged for limited oscillation relative to the cutter in the angular position in which the two flattened portions are parallel to the oscillating direction of the cutter, the spacer being operatively connected with a rotary dog guided in the toolhead for axial and rotatable displacement. The dog may be axially displaced and locked in a retracted position away from the spacer by insertion of a tool through an axial opening in the toolhead to facilitate cutter blade replacement.

5 Claims, 6 Drawing Figures

OSCILLATING CUTTING TOOLHEAD

This application is a continuation-in-part of application Ser. No. 126,905, filed Mar. 3, 1980 and now abandoned.

The invention relates to an oscillating cutting toolhead having an oscillating cutter consisting of two blades under a prestress directed radially inward, the blades applying at opposite points of a spacer disposed between the blades. Oscillating toolheads of the above described kind have become known through DE-OS No. 27 23 622. They have proved very successful in practice. It appeared, however, that the time needed for changing the total oscillating cutter including the spacer is susceptible of improvement over this known design.

It is, therefore, the object of the invention to improve a tool of the above described kind so that the entire oscillating cutter including the spacer can be changed more simply and faster than before.

According to the invention, this problem is solved in that the spacer has the cross-sectional form of a circle with two parallel flattened portions, is axially non-displaceable and rotatable about the longitudinal axis of the tool, and is arranged for limited oscillation with the cutter in the angular position in which the two flattened portions are parallel to the oscillating direction of the cutter, the spacer being in operative connection with a rotary dog guided for rotation and for axial displacement in the oscillating toolhead. The described design of an oscillating toolhead permits retaining the advantages of the known oscillating toolhead while yet allowing changing of the oscillating cutter with spacer in a simple manner.

In a development of the invention it is proposed that the spacer has a rectangular recess extending in the direction of the longitudinal axis of the tool, the longer faces of said recess being parallel to the flattened portions, into which recess there protrudes a driver of square or rectangular cross section disposed on the rotary dog and whose cross-sectional dimension is smaller in the direction of the longer face of the recess of the spacer than the latter. Thereby both a positive rotary entrainment and a reliable oscillation limitation is achieved in a simple manner. The driver can simply be pushed out of the rectangular recess axially and then the cutter together with the spacer can be removed from the toolhead.

In a further development it is proposed that the driver is extractable from the recess of the spacer counter to the force of a spring. The spring provides that the driver does not unintentially shift axially, so that the cutter could lose the oscillation limitation and the rotary actuation of the spacer.

According to another development it is proposed that the rotary dog is in operative connection with an actuating element of an actuating means non-rotationally but axially displaceable. It thus becomes possible, despite the necessary axial displaceability of the rotary dog, to move axially or to fix the actuating element required for creating the rotary movement and the respective actuating means independently of the rotary dog. This makes it possible to use actuating means of different functional principles (combined axial and rotary movement or rotary movement exclusively) and yet assures the necessary axial mobility of the rotary dog.

Further it is proposed according to the invention that the actuating element is connected with a piston of a piston-cylinder unit provided at the oscillating toolhead and has a steeply curved control cam track cooperating with guide pin and extending over 90° of the circumference, the pitch of said cam track having four times the value of the maximum piston stroke of the piston-cylinder unit. Thereby the rotary movement of the spacer can be brought about with especially simple means.

According to a further development of the invention, it is proposed that the spacer has a longitudinally extending opening and, on the end face toward the actuating means, a centrally arranged groove extending parallel to the flattened portions, an oscillation-limiting bolt firmly connected with a rotary dog protruding into the opening, and a claw provided on the rotary dog protruding into the groove. This facilitates establishing the rotary connection between rotary dog and spacer, making it more reliable while yet achieving the necessary oscillation limitation.

The construction and mode of operation of a tool according to the invention will now be further explained with reference to the attached drawings showing examples of realization.

Figure 2:
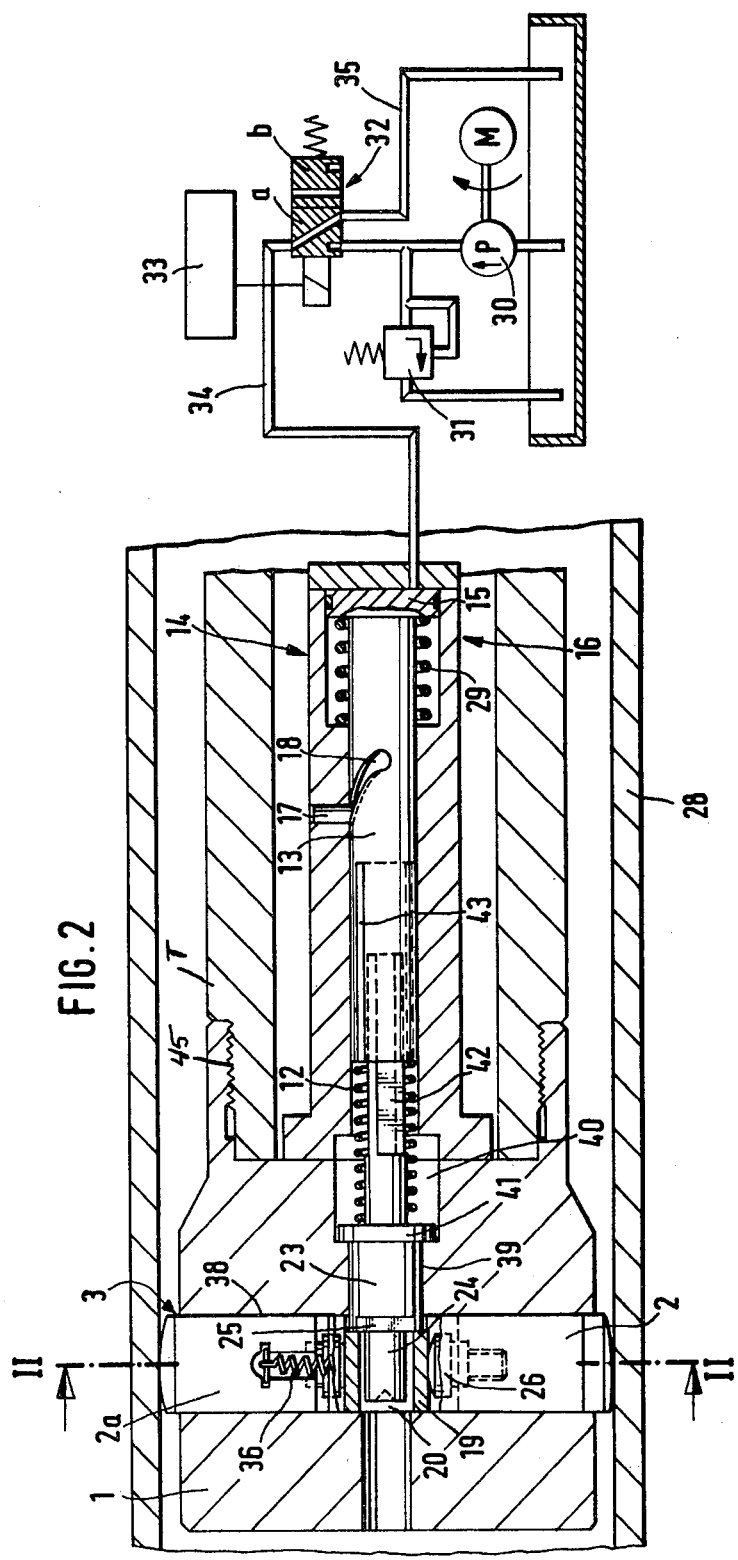
Figure 3:
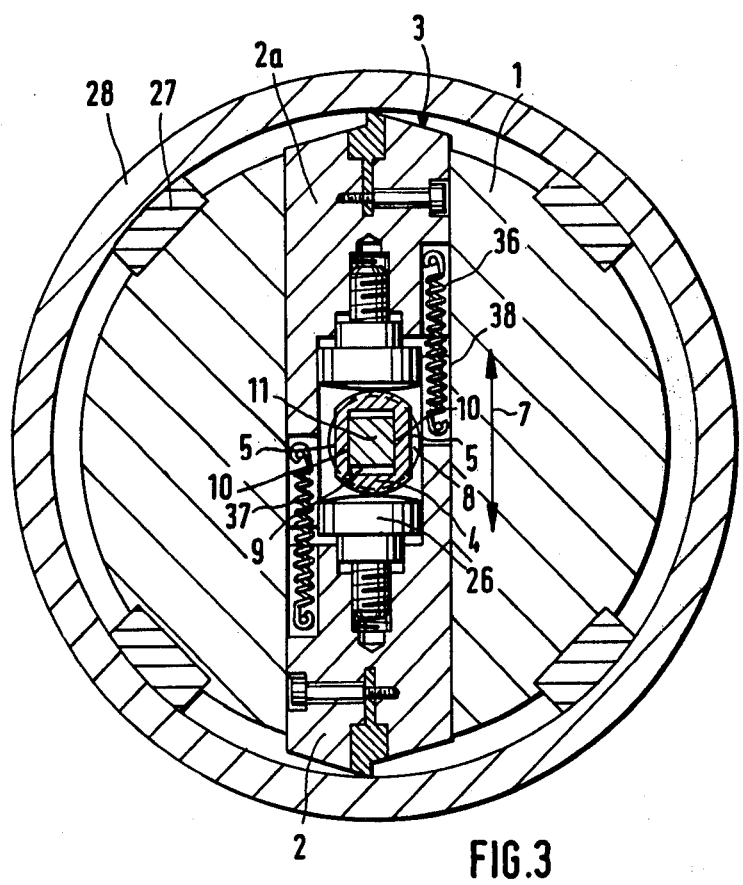
Figure 4:
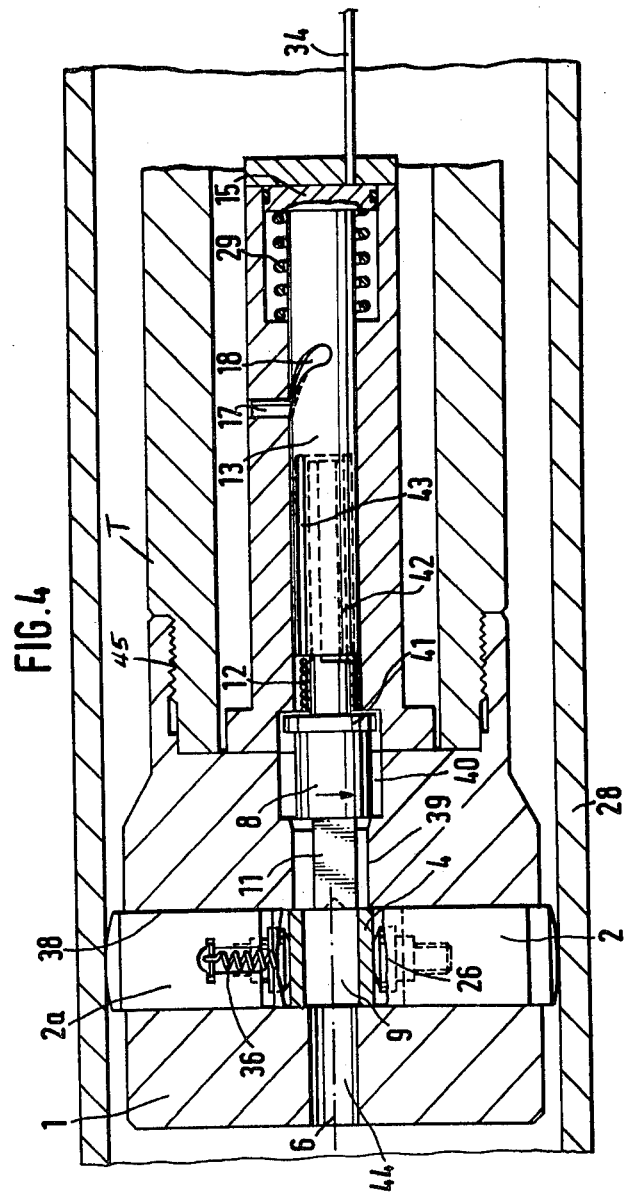
Figure 5:
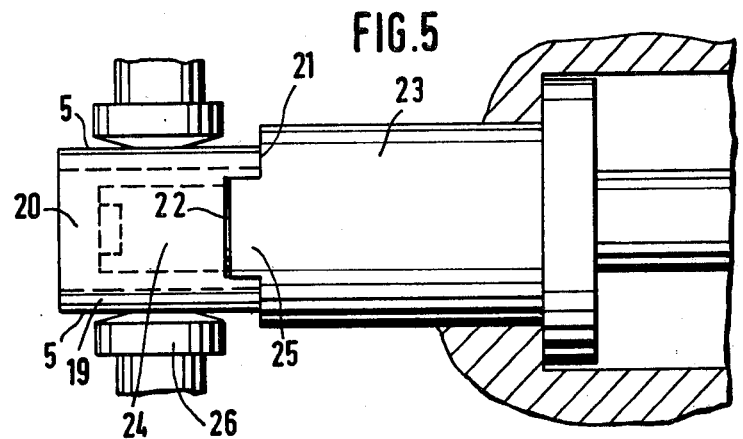
Figure 6:
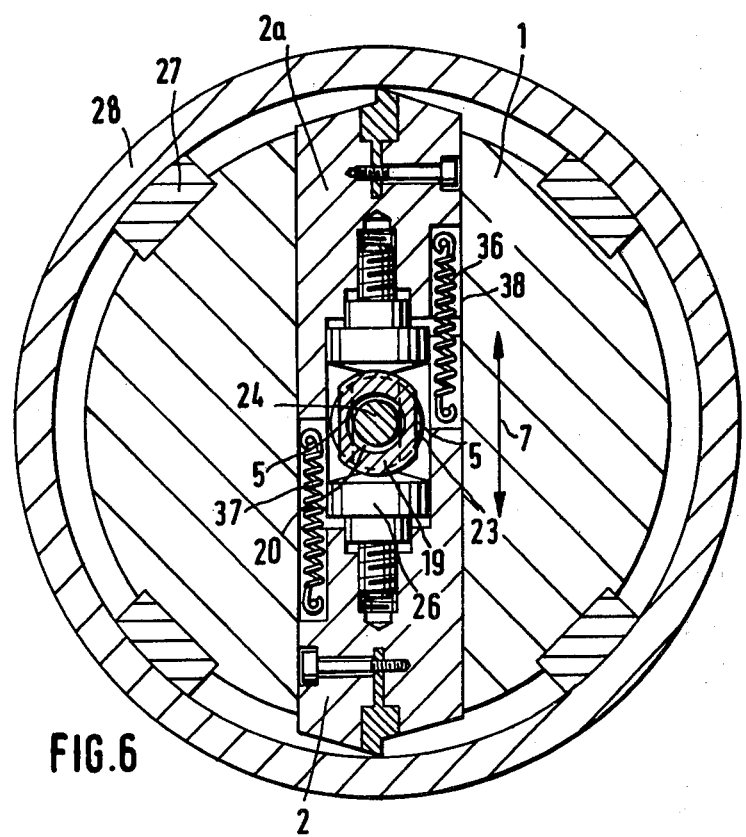

FIG. 1 shows a longitudinal section through oscillating cutting toolhead with rotation control;

FIG. 2, a longitudinal section as in FIG. 1, but with a different rotational drive;

FIG. 3, transverse section along line I—I of FIG. 1;

FIG. 4, section as in FIG. 1, but in position for removal of the oscillating cutter;

FIG. 5, enlarged detail of the rotary dog with spacer according to FIG. 2, but rotated by 90°;

FIG. 6, section along line II—II according to FIG. 2

FIG. 3 shows a cross section through an oscillating toolhead 1, which is contained in a bore of a workpiece 28 and is supported by guide strips 27 on the inside wall of the bore. Such guide strips 27 are used advantageously in the machining of deep bores but may alternatively be omitted if the toolhead is sufficiently supported by other means. The two blades 2, 2a of the oscillating cutter 3 are mounted and guided in a pocket 38 provided in the toolhead 1. The blades 2, 2a are held together by springs 36, 37 and pressed radially inwardly against the bearing surfaces of a spacer 4 which holds the blades 2, 2a apart at the distance desired for the machining of the bore. The contact faces of spacer 4 for the expanded position are arcuate and both have the same center. To withstand the occurring loads, spacer 4 should be hardened. Thereby maximum precision of the diameter setting of the blades 2, 2a is ensured. In a plane rotated by 90° the spacer 4 has opposite, parallel flattened portions 5. When the spacer 4 is rotated 90° about the longitudinal axis 6 of the tool (FIG. 1), the adjustable stops 26 of the blades 2, 2a apply against these flattened portions 5, whereby the blades 2, 2a are moved radially inward by a necessary amount. Spacer 4 is provided with a rectangular recess 9, into which there extends, in the embodiment, a driver 11 of square cross section. When driver 11 is rotated about the longitudinal axis 6 of the tool, it thereby rotates also spacer 4. But since the faces 10 of the rectangular recess 9 of spacer 4 are longer than the edge length of driver 11 of square cross section, spacer 4 has enought room left to swing together with the entire cutter 3 in direction 7. At the same time an oscillation limitation is achieved thereby.

The tool according to FIG. 3 is shown in longitudinal section in FIG. 1. An oscillating toolhead 1, which is supported in the bore of a workpiece 28 through guide strips not shown, is interrupted by a blade pocket 38 for receiving the blades 2 and 2a of cutter 3 held together radially through springs 36 and 37. Centrally between the blades is the spacer 4 which, through an adjustable stop 26 assigned to each blade 2, 2a, supports the two blades and is guided over the faces 10 at the respective faces of the driver protruding into the rectangular recess 9, in direction 7 in the angular position shown. Driver 11 is disposed at the front end of a rotary dog 8 whose cross section is cylindrical in its middle portion, this rotary dog being rotatable in a bore 39 of toolhead 1 about the longitudinal axis 6 of the tool and axially displaceable in the direction of said axis 6. At the end of dog 8 opposite driver 11, the cylindrical central portion of said dog 8 has a collar 41 which is received by the enlargement 40 of bore 39 and bears against the front end of the enlargement under the prestress of a spring 12, whereby the axial displacement of the dog is limited in this direction. In the region of spring 12, dog 8 has an elongated flat lug 42, which is guided in a matching slot 43 of an actuating element 13 non-rotationally but axially displaceable. Element 13 is guided in an actuating means 14 secured on the cutter head 1 for longitudinal displacement and rotationally and is fastened at the other end to the piston 15 of a piston-cylinder unit 16 forming a structural unit with the actuating means 14. On the side of actuating element 13, piston 15 is under the prestress of a spring 29. The actuating means 14 has a guide pin 17 embedded in it and projecting radially, which engages in a control cam track 18 cut into the surface of the actuating element 13. Cam track 18 extends at least over an area of 90° and must have a pitch which is not self-locking. To make it possible to travel through the cam track all the way, the possible displacement path of piston 15 must correspond to at least one fourth the pitch of cam track 18. In the situation shown, the tool is in operating position, that is, with the blades 2, 2a of cutter 3 spread apart. To bring the blades 2, 2a together for the return motion, the front of piston 15 is supplied with pressure oil through line 34 by pump 30, whose pressure is regulated by a pressure adjusting valve 31, at the moment when the solenoid valve 32 is in control position "a," valve 32 being actuated by a control means 33. With the admission of pressure oil on the front of piston 15, the piston moves forward counter to the force of spring 29 and together with cam track 18 and guide pin 17 causes an axial and simultaneously a rotary movement of element 13. Thereby, through lug 42, also dog 8 is rotated, and thus also spacer 4 is rotated through the driver 11. By a rotation of spacer 4 about 90° the adjustable stops 26 come to bear against the flattened portions 5 of spacer 4 and thus are moved together radially. Cutter 3 is securely fixed in the converged position. When solenoid valve 32 is moved to the control position "b", thereby line 34 is connected with line 35, owing to which the pressure oil can drain into the tank and thereby spring 29 moves piston 15 back into the starting position. The tool is ready for the next cycle.

FIG. 4 now shows how the oscillating cutter 3 together with spacer 4 can be removed from the toolhead. For this it suffices to push dog 8 axially into the tool counter to the force of spring 12, using for example a peg or screwdriver passed through bore 44, until further pushing is no longer possible. In this position, collar 41 applies against the rear end face of recess 40. The front end face of the cylindrical middle portion of dog 8 can now be placed against the front end face of the enlargement 40 by a short inclination in radial direction (see arrow). The spring force of spring 12 provides that dog 8 remains in this position. The actuating element 13 is not influenced by this axial displacement and radial movement of dog 8. In this situation cutter 3 can easily be removed from pocket 38 and a new cutter inserted, i.e. by unthreading the toolhead 1 from the boring tube T to which it is connected in known manner by thread portion 45. After the new cutter is in place, the peg or screwdriver is again passed through bore 44 and through the opening in spacer 4, and dog 8 is again moved radially back under light axial pressure until spring 12 pushes dog 8 back into bore 39 and thus dog 8 again comes into operative connection with spacer 4.

FIG. 2 shows a tool quite similar to that of FIG. 1. However, the operative connection between the dog and spacer is different. FIG. 5 shows an enlarged view of the changed area. A spacer 19 of the previously described external cross sectional form has an opening 20, preferably a cylindrical bore, into which there protrudes an oscillation-limiting bolt 24 of cylindrical cross section, whose diameter is smaller than the diameter of opening 20. At the end face 21, spacer 19 has a groove 22 extending parallel to the flattened portions 5. In to this groove 22 there engages a tongue 25 disposed on the rotary dog 23. Thereby a non-rotational connection between dog 23 and spacer 19 is provided. Along its side faces tongue 25 permits an oscillation limited by the oscillation-limiting bolt 24 and prevents oscillation normal to these faces. This, therefore, is a variant especially safe in operation and very easy to produce. Otherwise the operation of the tool is as has been described before. FIG. 6 lastly shows a section through the tool last described.

The tool according to the invention offers all advantages of a tool according to DE-OS No. 27 23 622, but greatly facilitates its handling.

Having thus described the invention and illustrated its use, what is claimed as new and is desired to be secured by Letters Patent is:

1. In a boring tool, a combination comprising a toolhead having a longitudinal axis and being provided with a slot extending transverse to said axis; a pair of oppositely directed cutting knives floatably mounted in said slot and movable away from each other to a cutting position and toward each other to an inactive position, each of said cutting knives having an outer cutting edge and an inner end face opposite a corresponding end face of the other cutting knife; biasing means connected to said cutting knives for biasing the same toward each other to said inactive position; a spacer disposed between said cutting knives and in engagement therewith, said spacer being generally circular in transverse section and including two parallel, axially directed flattened portions, said spacer being fixed against movement along but rotatable about the longitudinal axis of said toolhead to move said knives away from each other against the action of the biasing means; a rectangular recess formed in said spacer, said recess having transversely directed guide edges parallel to said flattened portions of said spacer, a rotary and axially movable dog member including a drive portion disposed within said recess of said spacer, means in said toolhead supporting said dog member during rotation and axial movement thereof, spring means in said toolhead to normally bias said dog member axially toward said recess said dog member including side edges slidingly engaging said recess guide edges, the transverse extent of said drive portion being less than the transverse length of said recess, thereby to couple said dog and spacer for rotary motion while permitting limited floating movement of said parts when said flattened portions of said spacer are parallel to the direction of floating movement of said cutting knives, drive means for rotating said dog member and coupling means between said drive means and said dog member permitting limited axial movement of said dog member and limited transverse movement thereof, shoulder means in said toolhead for selective engagement with said dog member when it is in its retracted position against the spring means to retain the dog member against axial movement, a hand tool access opening in a face of the toolhead to permit a hand tool to be inserted therein to engage and manually shift said dog member axially and then transversely in the toolhead into engagement with said shoulder means wherein said drive portion is clear of said spacer, said cutting knives in the cleared position of said drive portion being removable from said toolhead.

2. In a boring tool as defined in claim 1, wherein said drive means for rotating said dog member includes an actuating means operatively connected to said dog member and hydraulic means for shifting said actuating means axially, said actuating means being not-rotatably mounted in the toolhead.

3. Apparatus in accordance with claim 2 and including an actuating element interposed between said dog member and said actuating means, a cam and follower connection interposed between said actuating means and actuating element, said cam and follower connection being arranged to effect a 90° rotation of said actuator element by predetermined axial movement of said actuator means responsive to said hydraulic means.

4. Apparatus in accordance with claim 3 wherein said cam is in the form of a track and extends over an arc of 90° and the pitch of said cam has four times the value of the maximum stroke of said hydraulic means.

5. Apparatus in accordance with claim 1 characterized in that said spacer includes an axially extending central opening, the end face of said spacer nearest said dog member including a centrally arranged transverse groove parallel to said flattened portions, oscillation limit stop means connected with said dog member and extending into said opening, and a tongue member mounted on said dog member and projecting into said groove.

* * * * *